(12) United States Patent
Vallee et al.

(10) Patent No.: US 9,664,144 B2
(45) Date of Patent: May 30, 2017

(54) INTAKE HOUSING INCLUDING A HEAT EXCHANGER

(75) Inventors: Nicolas Vallee, Bazancourt (FR); Yoann Naudin, Saint Loup en Champagne (FR); Olivier Schild, Tinqueux (FR); Demetrio Onetti, Saint-Brice Courcelles (FR); Yann Pichenot, Longueval (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 392 days.

(21) Appl. No.: 14/004,267

(22) PCT Filed: Feb. 13, 2012

(86) PCT No.: PCT/EP2012/052390
§ 371 (c)(1),
(2), (4) Date: Apr. 14, 2014

(87) PCT Pub. No.: WO2012/119834
PCT Pub. Date: Sep. 13, 2012

(65) Prior Publication Data
US 2014/0251289 A1  Sep. 11, 2014

(30) Foreign Application Priority Data
Mar. 10, 2011 (FR) .................... 11 51992

(51) Int. Cl.
F02B 47/08 (2006.01)
F01N 3/02 (2006.01)
(Continued)

(52) U.S. Cl.
CPC ..... *F02M 25/0747* (2013.01); *F02B 29/0462* (2013.01); *F02B 29/0475* (2013.01);
(Continued)

(58) Field of Classification Search
CPC .......... F02M 25/0707; F02M 25/0737; F02M 25/0731
(Continued)

(56) References Cited

U.S. PATENT DOCUMENTS 2,198,305 A  4/1940  Crawford
2,684,690 A  7/1954  Lee
(Continued)

FOREIGN PATENT DOCUMENTS

DE  102009050258 B3  11/2010
FR      2906017 A1   3/2008
(Continued)

OTHER PUBLICATIONS

English Language abstract for DE 102009050258 extracted from espacenet.com database on Apr. 1, 2014, 12 pages.
(Continued)

*Primary Examiner* — Carlos A Rivera
*Assistant Examiner* — Syed O Hasan
(74) *Attorney, Agent, or Firm* — Howard & Howard Attorneys PLLC

(57) ABSTRACT

The invention concerns an intake housing 1 for an internal combustion engine, capable of receiving a heat exchanger for exchanging heat between a feed gas stream circulating in the housing and a coolant, wherein said intake housing 1 includes a space 3 for the circulation of the feed gas and a space 2 for receiving the heat exchanger, said receiving space 2 being defined by at least a first metal component 4, 5 including at least one extension 16, 17 that is in one piece with the first metal component 4, 5, said extension 16, 17 at least partially defining the space 3 for the circulation of the feed gas.

10 Claims, 2 Drawing Sheets

(51) Int. Cl.
*F02M 25/07* (2006.01)
*F02B 29/04* (2006.01)
*F02M 35/10* (2006.01)
*F28F 9/00* (2006.01)
*F28D 9/00* (2006.01)
*F02M 26/41* (2016.01)

(52) U.S. Cl.
CPC ........ *F02M 26/41* (2016.02); *F02M 35/1036* (2013.01); *F02M 35/10327* (2013.01); *F28D 9/0043* (2013.01); *F28F 9/001* (2013.01); *Y02T 10/146* (2013.01)

(58) Field of Classification Search
USPC ................. 123/568.12–568.32; 165/167–176
See application file for complete search history.

(56) References Cited

U.S. PATENT DOCUMENTS

| | | | |
|---|---|---|---|
| 2,875,986 A | 3/1959 | Holm | |
| 3,525,391 A | 8/1970 | Day | |
| 3,895,674 A | 7/1975 | Harris | |
| 4,038,191 A | 7/1977 | Davis et al. | |
| 4,596,287 A | 6/1986 | Wissmath | |
| 7,882,827 B2* | 2/2011 | Grunenwald | F02M 25/0728 123/568.12 |
| 8,720,536 B2 | 5/2014 | Vaughn et al. | |
| 2006/0278377 A1* | 12/2006 | Martins | F02B 29/0412 165/140 |
| 2008/0314062 A1 | 12/2008 | Ritchey | |
| 2011/0088663 A1 | 4/2011 | Dehnen et al. | |
| 2011/0168366 A1* | 7/2011 | Garret | F28D 9/0043 165/148 |
| 2013/0074814 A1 | 3/2013 | Schatz et al. | |

FOREIGN PATENT DOCUMENTS

| | | |
|---|---|---|
| GB | 1 413 473 | 11/1975 |
| WO | WO 20051001272 A1 | 1/2005 |
| WO | WO 20081003074 A2 | 1/2008 |
| WO | WO 20091156365 A1 | 12/2009 |
| WO | WO2010146063 * | 6/2010 |
| WO | WO 20101146063 A1 | 12/2010 |
| WO | WO 20121119835 A1 | 9/2012 |

OTHER PUBLICATIONS

English Language abstract for FR 290617 and machine assisted translation extracted from espacenet.com database on Apr. 2, 2014, 37 pages.
English Language abstract for WO 2005/001272 extracted from espacenet.com database on Apr. 1, 2014, xx pages.
English Language abstract for WO 2009/156365 extracted from espacenet.com database on Apr. 1, 2014, 27 pages.
English Language abstract for WO 2010/146063 and machine assisted translation extracted from espacenet.com database on Apr. 1, 2014, 40 pages.
PCT International Search Report for PCT/EP2012/052390, dated Mar. 16, 2012, 5 pages.
PCT International Search Report for PCT/EP2012/052391, dated Mar. 26, 2012, 7 pages.
U.S. Appl. No. 14/004,251, filed on Sep. 10, 2013, "Covering for an Intake Housing", 13 pages. This is the English Language Appln. equivalent to WO 2012/119835.

* cited by examiner

INTAKE HOUSING INCLUDING A HEAT EXCHANGER

RELATED APPLICATIONS

This application claims is the National Stage of International Patent Application No. PCT/EP2012/052390, filed on Feb. 13, 2012, which claims priority to and all the advantages of French Patent Application No. FR 1151992, filed on Mar. 10, 2011, the content of which is incorporated herein by reference.

The invention concerns an intake housing for a feed gas stream of an internal combustion engine and an intake module for a feed gas stream provided with such a housing. By gas is meant air or a mixture of air and exhaust gas.

The invention will in particular find applications as an integral part of a gas intake device for feeding said gas into the cylinder head of a motor vehicle internal combustion engine.

BACKGROUND

A motor vehicle internal combustion engine includes a plurality of combustion chambers each delimited by a piston, a cylinder and a portion of a cylinder head. These combustion chambers receive a mixture of fuel and combustion-supporting gas to be burned to generate the work of the engine. The combustion-supporting gas includes air, which may be compressed or not, depending on whether the engine includes a turbocompressor or not. The air may moreover be mixed with exhaust gas referred to as recirculated exhaust gas. The gas fed into the combustion chamber will be referred to hereinafter as feed gas.

It is known to increase the density of this feed gas by cooling it, for example by encouraging an exchange of heat between the feed gas and a stream of air external to the vehicle by means of an air/air heat exchanger.

It is also known to effect this cooling by exchange of heat between the feed gas and a so-called coolant, for example taking the form of a liquid that circulates in a heat exchanger through which the feed gas passes.

In the former case, the heat exchanger is installed inside a housing which delimits the intake circuit with respect to the air around the internal combustion engine. This housing may be made from a plastic material, for example, and the heat exchanger is then accommodated in this plastic material housing. However, this type of plastic housing proves not to be resistant to the high temperatures that may be encountered, notably when the internal combustion engine is equipped with a turbocompressor and/or if the internal combustion engine uses diesel oil as fuel.

This situation has been overcome by the use of metal housings produced by a casting process. The heat exchanger then has thick walls and is capped by a cast inlet box and a cast outlet box for the feed gas. The intake housing is then made airtight by welding the inlet box and the outlet box to the thick walls of the heat exchanger. Such a solution, although satisfactory from the point of view of withstanding thermal loads, is costly to implement, notably because of the use of cast components. Moreover, there are numerous assembly steps, and this adds to the cost of this component.

SUMMARY OF THE INVENTION

The object of the present invention is therefore to overcome the drawbacks described hereinabove primarily by producing an intake housing the wall of which that surrounds the heat exchanger is extended in order to border an entry space and/or an exit space in which the feed gas stream circulates, i.e. a space in which the gas stream enters or leaves the heat exchanger.

The invention thus consist in an intake housing for an internal combustion engine, capable of receiving a heat exchanger for exchanging heat between a feed gas stream circulating in the housing and a coolant, wherein said intake housing includes a space for the circulation of the feed gas and a space for receiving the heat exchanger, said receiving space being defined by at least a first metal component including an extension that is in one piece with the first metal component, said extension at least partially defining the space for the circulation of the feed gas. Clearly the receiving space is a space in which the heat exchanger is inscribed, but is strictly limited to the latter. It is equally clear that the circulation space is the area of the housing contained between a front face of the heat exchanger and the orifice through which the feed gas stream circulates, whether that is to enter or to leave the housing.

In accordance with a first feature of the invention, the metal component is a plate constituted at least in part of aluminum.

In accordance with a different or complementary variant, the metal component is shaped by pressing.

In accordance with a second feature of the invention, the extension lies in a plane coinciding with a plane in which the metal component lies. Such a solution facilitates the manufacture of the metal component and the extension.

In accordance with another feature of the invention, the receiving space is delimited by a second metal component that includes an extension in one piece with the second metal component, said extension delimiting the feed gas circulation space on the side opposite the first metal component relative to the heat exchanger. Here it is clear that the heat exchanger is disposed between two metal components each of which is extended by an extension defining a flow circulation space.

In accordance with a further feature of the invention, the intake housing includes a lid that extends between the first metal component and the second metal component to delimit the feed gas circulation space. This space is thus bordered exclusively by the extensions of the metal components and by a wall forming a lid for isolating the circulation space from the environment of the intake housing.

In accordance with a further feature of the invention, the extension includes at least one mechanical reinforcement. In one embodiment, this mechanical reinforcement takes the form of one or more ribs formed across the extension. Such an arrangement limits deformation of the extension caused by the pressure of the feed gas inside the circulation space.

The first metal component is advantageously fastened to the heat exchanger. Such an arrangement makes it possible to produce a one-piece intermediate part that includes the heat exchanger and delimits at least in part the feed gas circulation space leading into and/or out of the heat exchanger. Once assembled, the heat exchanger thus includes walls that border at least in part the entry chamber and/or the exit chamber of the intake housing.

The first metal component is advantageously an end plate forming part of the heat exchanger. The end plate thus forms part of the assembly of component parts of the exchanger that are placed in contact with one another before a brazing step, notably by placing them in an oven.

It will very particularly be noted that the feed gas circulation space has an intake orifice for said gas, said extension being for the most part on the same side as the intake orifice.

Finally, the invention is aimed at an air intake module of an internal combustion engine, including an intake housing as described above and a heat exchanger in said intake housing.

A first advantage of the invention is the provision of an intake housing that is simple and economical to manufacture and able to withstand high intake temperatures.

Another advantage is the possibility of manufacturing the walls of the intake housing at the same time as producing the heat exchanger, so as to form a unitary component to which a lid is added so as finally to constitute a finished product consisting of an air intake module.

BRIEF DESCRIPTION OF THE DRAWINGS

Other features, details and advantages of the invention will emerge more clearly from a reading of the description given hereinafter by way of illustration and with reference to the drawings, in which.

DETAILED DESCRIPTION

Figure 1:
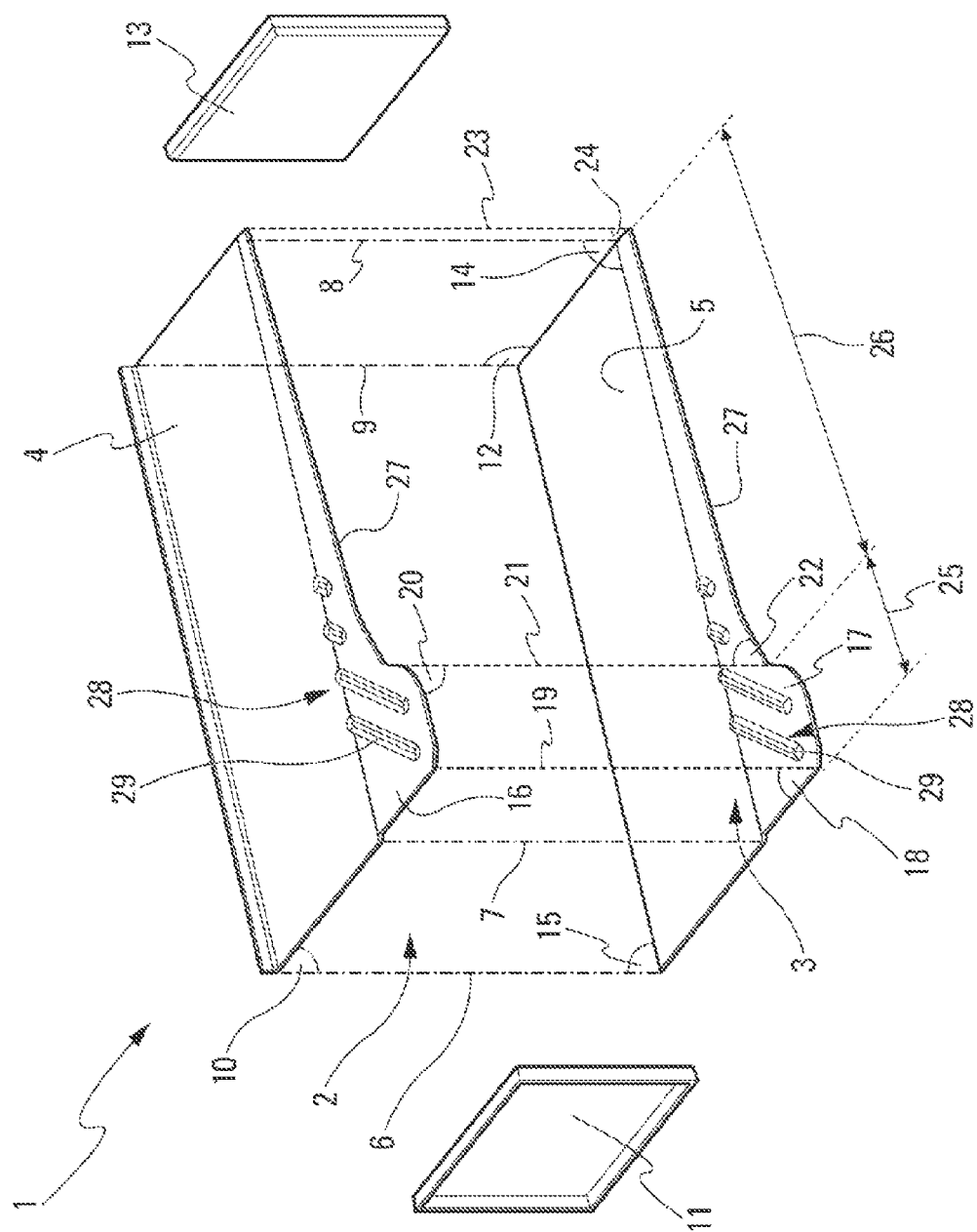
FIG. 1 is a perspective view of an intake housing of one embodiment of the invention.

FIG. 1 shows the intake housing 1 of one embodiment of the invention. Such a housing receives a heat exchanger (visible in FIG. 2) through which passes a stream of feed gas circulating in the housing. The principal function of this heat exchanger is to cool the feed gas before its entry into the combustion chambers of an internal combustion engine equipping a motor vehicle. The gas stream is cooled by a transfer of heat between it and a coolant that circulates inside the heat exchanger. This coolant is a fluid that circulates in a cooling loop with which the vehicle is equipped, for example. Such an engine cooling loop or circuit contributes to the thermal conditioning of the internal combustion engine with which the vehicle is equipped.

The intake housing 1 includes or delimits a space 2 receiving the heat exchanger and a feed gas circulation space 3.

The receiving space 2 is the area of the intake housing 1 in which the whole of the heat exchanger lies. In other words, the receiving space 2 is identical or substantially identical to the space occupied by the heat exchanger.

To be more precise, this receiving space 2 is delimited at least by a first metal component 4. A second metal component 5 also delimits the receiving space 2 and this second metal component 5 is installed opposite the first metal component 4 relative to the receiving space 2, in other words relative to the heat exchanger. The first metal component 4 and/or the second metal component 5 each consists of a plate made at least in part from aluminum, advantageously from an aluminum alloy that can be brazed in an oven.

The first metal component 4 and the second metal component 5 lie in separate and parallel planes. Chain-dotted lines 6 to 9 connect the corners of the two metal components 4 and 5. These chain-dotted lines show the corners that border the receiving area 2.

A first lateral plane 10 passes through the first line 6 and the second line 7. This first lateral plane delimits one of the sides of the receiving area and a first side plate 11 is installed in the first lateral plane 10 to close this side of the receiving space 2.

On the opposite side of the receiving area 2 to this first lateral plane 10 there is a second lateral plane 12, notably parallel to the first lateral plane 10. This second lateral plane 12 passes through the third line 8 and the fourth line 9 and thus delimits the space 2 receiving the heat exchanger. This second lateral plane 12 receives a second side plate 13 that closes the space 2 receiving the heat exchanger on the side opposite that which receives the first side plate 11.

A front plane 14 and a rear plane 15 are perpendicular to the first lateral plane 10 and the second lateral plane 12.

The front plane 14 passes through the second line 7 and the third line 8 and defines a feed gas entry face leading into the heat exchanger. This entry is notably parallel to and/or coincides with a front face of the exchanger that can be seen in FIG. 2.

The rear plane 15 passes through the first line 6 and the fourth line 9. This rear plane 15 is parallel to a rear face of the heat exchanger through which the feed gas stream is evacuated from or leaves the heat exchanger, for example.

It is therefore clear that the feed gas stream that circulates between the front plane 14 and the rear plane 15 circulates through the heat exchanger and is cooled by the circulation of a liquid inside a tube bundle of the exchanger.

The space 2 receiving the heat exchanger is thus delimited in its entirety by:
the first and second metal components 4 and 5,
the first and second lateral planes 10 and 12, and
the front plane 14 and the rear plane 15.

To enable entry to and/or exit from the receiving space it is necessary to provide entry and/or exit areas or portions. The circulation space of the invention forms such an area or portion.

In the FIG. 1 example, the feed gas circulation space 3 is delimited at least in part by an extension 16 of the first metal component 4. This extension 16 is in one piece with the first metal component 4 in the sense that the extension 16 extends the first metal component in the same constituent material as that metal component and without the presence of a weld or any filler metal. In other words, the metal component and the extension are produced in one piece from the same plate or the same strip.

The metal component and its extension are advantageously formed by a cutting and pressing operation. Such a forming process is possible because the metal component is produced from a strip rather than by a casting process.

The following example describes the circulation space 3 in a situation in which that space constitutes an entry area or chamber for the feed gas stream leading into the exchanger. It is obvious that the invention is not limited to such a situation and it will be understood that this circulation space, delimited by the extension, can equally be a feed gas outlet chamber, i.e. it can follow on from passage through the heat exchanger.

The extension 16 of the first metal component delimits at least in part the circulation space 3 in the sense that this extension channels the flow of feed gas in the direction of the heat exchanger. In accordance with a variant of the invention, the circulation space 3 is also delimited or bordered by an extension 17 that forms part of the second metal component 5.

This circulation space 3 is further delimited by a first plane sector 18 that passes through the second line 7 and a dashed fifth line 19. The delimitation of this circulation space 3 is continued by a first curved sector 20 that passes through the fifth line 19 and a dashed sixth line 21. The latter is placed at a point of inflexion that delimits the first curved sector 20 relative to a second curved sector 22 that extends as far as a dashed seventh line 23. The circulation space 3 is further delimited by a second plane sector 24 that passes through the seventh line 23 and by the third line 8. This circulation space 3 is finally delimited by the front plane 14. In the description given in this paragraph, it will be noted that the circulation space 3 does not contain the heat exchanger, the latter being confined to the receiving space 2.

The circulation space 3 for the feed gas stream is thus delimited in its entirety by:
  the extension 16 of the first element 4 and the extension 17 of the second element 5,
  the first and second plane sectors 18 and 24,
  the first and second curved sectors 20 and 22, and
  the front plane 14.

The section of the circulation space 3 changes from the first plane sector 18 to the second plane sector 24, but it must be borne in mind that this circulation space has a first portion 25 wider than a second portion 26, this width corresponding to the distance between the front plane 14 and the edge 27 of the extension 16 or 17. The feed gas circulation space 3 has a gas intake orifice parallel to the first plane sector 18. It is through this orifice that the feed gas stream enters the circulation space 3 and thus the intake housing in accordance with the invention. This intake orifice therefore has a length defined by the distance between the extension 16 of the first metal component and the extension 17 of the second metal component 5. The width of this orifice is defined by the distance between the second line 7 and the fifth line 19. It is therefore clear that the extension is for the most part on the same side as the intake orifice, its width being greater at the level of the first portion 25 than at the level of the second portion 26.

The extension 16 of the first metal component 4 and/or the extension 17 of the second metal component 5 includes at least one mechanical reinforcement 28. In the embodiment shown in this figure, the mechanical reinforcement 28 takes the form of one or more ribs or deformations 29 produced by deformation of the plate constituting the extension. This mechanical reinforcement is limited to the extension and does not extend onto the metal component. This arrangement provides a structural reinforcement at the level of the extensions to prevent the latter from being deformed by the pressure in the intake housing, notably in the case of internal combustion engines equipped with a compressor or turbocompressor.

Figure 2:
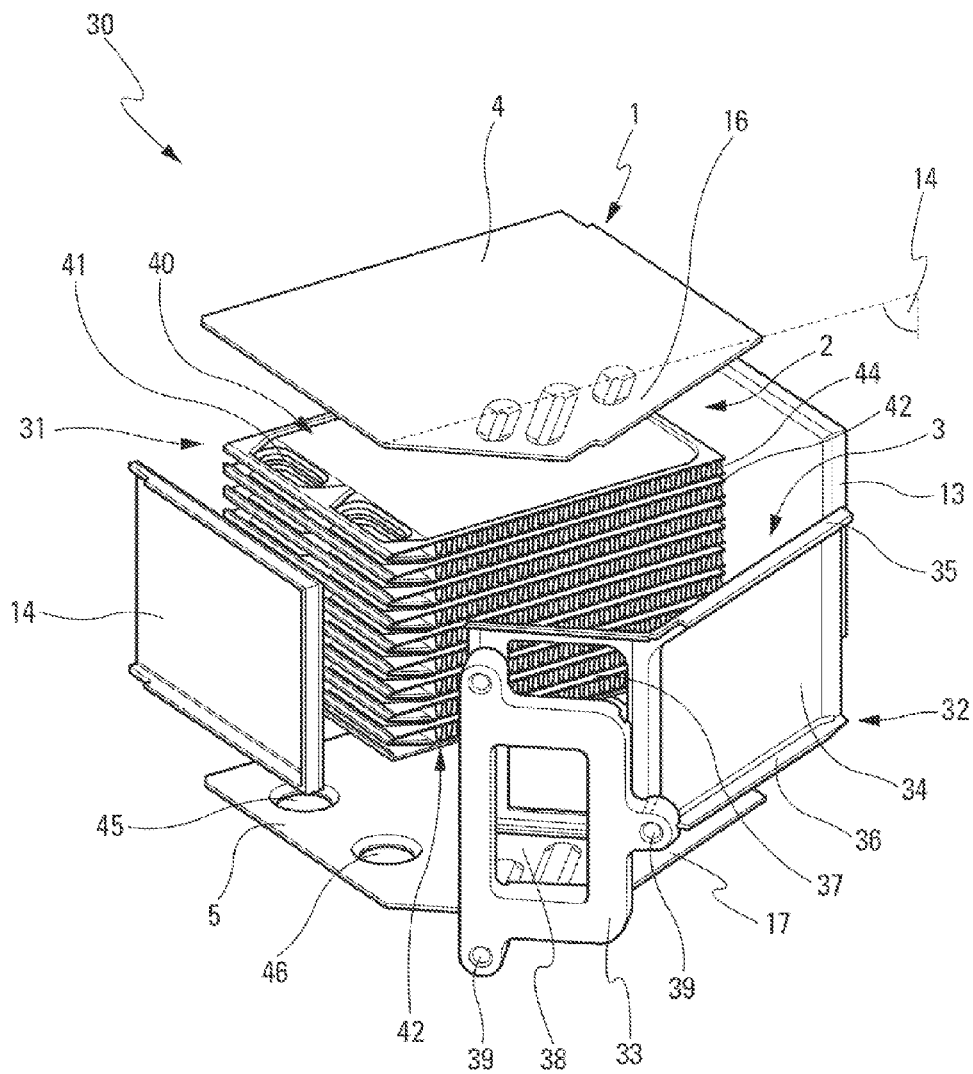
FIG. 2 is a perspective view of an intake module of one embodiment of the invention.

FIG. 2 shows an intake module 30 in accordance with the invention. This intake module consists of an intake housing 1 as shown in FIG. 1 and a heat exchanger 31. This intake module 30 is advantageously completed by the installation of a lid 32. Moreover, a flange 33 may be added.

The lid 32 is an element that closes the circulation space 3 so as to isolate the feed gas stream that circulates in the housing from the exterior of the housing. This lid lies in at least one plane perpendicular to the plane in which the extension 16 lies. The lid 32 begins at the extension 16 of the first metal component 4 and ends at the extension 17 of the second metal component 5, which makes it possible to delimit the circulation space 3 conjointly with the extension 16 of the first metal component 4 and the extension 17 of the second metal component 5.

This lid 32 is made from metal, notably aluminum or aluminum alloy, plate or strip. This lid is shaped by a pressing process. This lid 32 includes a central strip 34 of substantially parallelepiped shape and two flanks 35 and 36 that extend the length of the central strip 34. These flanks 35 and 36 lie in a plane perpendicular to the plane in which the central strip lies. They are produced by a bending operation, for example, or during the pressing operation.

This lid 32 includes a first sector beginning at one longitudinal end of the lid. This first sector lies in a first plane and is continued by a second sector that lies in a second plane inclined relative to the first plane at an angle between 40 and 90°, for example, by virtue of a bend in the anticlockwise direction. The lid 1 is in this case generally L-shaped.

The intake orifice 37, through which the feed gas stream enters the circulation space 3, is produced through the first sector of the lid 32. The flange 33 includes a central opening 38 with dimensions substantially equivalent to the dimensions of the intake orifice 37. This flange 33 is attached to the second sector of the lid 32 and includes fixing means 39 for fastening a pipe of the intake circuit of the engine of the vehicle.

One embodiment of the heat exchanger will now be described.

The heat exchanger 31 includes a tube bundle 40 and an area 41 for distributing the coolant into the bundle. The tube bundle 40 is the portion dedicated to the exchange of heat between the feed gas stream and the coolant. The heat exchanger includes a plurality of tubes 42, each produced by a pair of plates placed against each other. A passage between these plates channels the circulation of the coolant liquid in the tube bundle 40. The plane that passes through the edge of each tube defines a front face 43 of the heat exchanger 31, this face being the first through which the feed gas stream passes in the direction in which it circulates in the intake module 30. The plane that passes through this front face 43 is here parallel to and/or coincides with the front plane 14 that separates the receiving space 2 from the circulation space 3.

The heat exchanger 31 also includes the coolant distribution area 41 into which the coolant is channeled in order to be distributed to each tube 42 of the tube bundle 40. Corrugated inserts 44 between the tubes 42 encourage the transfer of heat between the coolant and the feed gas stream circulating in the intake module 30.

The first metal component 4, equipped with its extension 16, is fastened to the heat exchanger 31. In one embodiment, the first metal component is welded to the heat exchanger after the latter is assembled. In a variant embodiment, the first metal component 4 is an end plate of the heat exchanger 31 forming part of the latter. An end plate is a component placed against the heat exchanger and fastened to the latter at the same time as the other components of the heat exchanger, notably the plates and the inserts. This end plate may be placed against the last insert of the heat exchanger so as to provide it with mechanical protection. This plate can also contribute to the formation of a tube 42 in which the liquid circulates.

The above paragraph refers to the first metal component 4 but it goes without saying that the exchanger may be manufactured so that it incorporates a first metal component 4 and a second metal component 5 each including an extension delimiting an entry and/or exit chamber of the intake housing.

FIG. 2 also shows the presence of a first hole 45 and a second hole 46 through at least one of the metal components 4 or 5. Here the two holes 45 and 46 pass through the second metal component 5 substantially in front of the distribution area 41 through which the fluid is distributed into the tubes 42. These two holes enable the coolant to enter the heat exchanger 31 and serve as seats receiving tubes attached to the metal component, for example at the same time as brazing the intake housing 1 or the intake module 30.

The above description refers to an extension or excrescence on each metal component but the invention also covers the situation in which at least one of the two metal components includes a plurality of extensions or excrescences that lie on either side of the portion of the metal component that covers or straddle the receiving area 2 of the heat exchanger. Such an arrangement enables production of an intake housing incorporating:
- a space for receiving a heat exchanger delimited by a metal component,
- an intake chamber situated on the upstream side of the receiving space in the direction of the flow in the housing,
- an evacuation chamber situated on the downstream side of the receiving space in the direction of the flow in the housing,
- each chamber being delimited at least by an extension in one piece with the metal component.

An air intake module in accordance with the invention is produced by the following process:
- pre-assembly of at least a heat exchanger, a metal component 4 placed against the exchanger and including an extension 16 and a lid 32,
- placement in an oven to braze the pre-assembled components simultaneously.

In accordance with an improvement to this process, the first side plate 11 and the second side plate 13 are pre-assembled in order to be brazed at the same time as the pre-assembled components.

The invention claimed is:

1. An intake housing (1) for an internal combustion engine, capable of receiving a heat exchanger (31) for exchanging heat between a feed gas stream circulating in the housing and a coolant, wherein said intake housing (1) includes a feed gas circulation space (3) for the circulation of the feed gas and a receiving space (2) receiving the heat exchanger (31), said receiving space (2) being defined by at least a first metal component (4, 5) including at least one extension (16, 17) that is in one piece with the first metal component (4, 5), said extension (16, 17) at least partially defining the feed gas circulation space (3) for the circulation of the feed gas, wherein the extension (16, 17) includes at least one mechanical reinforcement (28) and wherein the mechanical reinforcement (28) takes the form of multiple deformations (29) produced by deformation of a portion of the first metal component (4, 5) constituting said extension (16, 17), wherein the mechanical reinforcement (28) is limited only to said extension (16, 17) and is in the form of one or more ribs, and wherein one of the extension (16) lies in a plane coinciding with a plane in which one of the first metal component (4) lies and wherein another of the extension (17) lies in a plane coinciding with a plane in which another of the first metal component (5) lies, and wherein the plane in which said one of the first metal component (4) lies is parallel to the plane in which said another of the first metal component (5) lies.

2. The intake housing as claimed in claim 1, wherein the first metal component (4, 5) is a plate consisting at least in part of aluminum and produced by pressing.

3. The intake housing as claimed in claim 1, wherein the receiving space (2) is delimited by a second metal component (5) that includes an extension (17) in one piece with the second metal component (5), said extension (7) delimiting the feed gas circulation space (3) on the side opposite the first metal component (4) relative to the heat exchanger (31).

4. The intake housing as claimed in claim 3, including a lid (32) that extends between the first metal component (4) and the second metal component (5) to delimit the feed gas circulation space (3).

5. The intake housing as claimed in claim 1, wherein the first metal component (4) is fastened to the heat exchanger (31).

6. The intake housing as claimed in claim 5, wherein the first metal component (4) is an end plate forming part of the heat exchanger (31).

7. The intake housing as claimed in claim 3, wherein the feed gas circulation space (3) includes an intake orifice (37) for said gas, said extension (16, 17) being for the most part on the same side as the intake orifice (37).

8. An air intake module (30) of an internal combustion engine, including an intake housing (1) as claimed in claim 1 and a heat exchanger (31) in said intake housing (1).

9. The intake housing as claimed in claim 2, wherein the receiving space (2) is delimited by a second metal component (5) that includes an extension (17) in one piece with the second metal component (5), said extension (7) delimiting the feed gas circulation space (3) on the side opposite the first metal component (4) relative to the heat exchanger (31).

10. An air intake module (30) of an internal combustion engine, including an intake housing (1) as claimed in claim 2 and a heat exchanger (31) in said intake housing (1).

* * * * *